United States Patent
Tang et al.

(10) Patent No.: US 9,438,346 B2
(45) Date of Patent: Sep. 6, 2016

(54) DUAL RATE TRANSCEIVER

(71) Applicant: Cisco Technology, Inc., San Jose, CA (US)

(72) Inventors: Norman Tang, Los Altos, CA (US); Liang Ping Peng, Santa Clara, CA (US); David Lai, Mountain View, CA (US); Anthony Nguyen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 138 days.

(21) Appl. No.: 14/153,318

(22) Filed: Jan. 13, 2014

(65) Prior Publication Data

US 2015/0200726 A1 Jul. 16, 2015

(51) Int. Cl.
*H04B 10/00* (2013.01)
*H04B 10/40* (2013.01)
*H04B 10/079* (2013.01)
*H04B 10/564* (2013.01)

(52) U.S. Cl.
CPC .......... *H04B 10/40* (2013.01); *H04B 10/0795* (2013.01); *H04B 10/564* (2013.01)

(58) Field of Classification Search
CPC . H04B 10/2581; H04B 10/40; H04B 10/541
See application file for complete search history.

(56) References Cited

U.S. PATENT DOCUMENTS

| | | | |
|---|---|---|---|
| 6,928,086 B2 * | 8/2005 | Abler et al. | 370/465 |
| 2003/0002108 A1 * | 1/2003 | Ames et al. | 359/152 |
| 2005/0097212 A1 * | 5/2005 | Engel | H04L 69/14 709/230 |
| 2005/0111845 A1 * | 5/2005 | Nelson et al. | 398/138 |
| 2008/0195770 A1 * | 8/2008 | Wang et al. | 710/18 |
| 2013/0073749 A1 * | 3/2013 | Tremblay et al. | 710/16 |

* cited by examiner

*Primary Examiner* — Dzung Tran
(74) *Attorney, Agent, or Firm* — Merchant & Gould P.C.

(57) ABSTRACT

A dual rate transceiver may be provided. First, a host data speed of a host device may be detected. Then a last know data speed of a transceiver may be determined. Next, it may be determined that the host data speed and the last know data speed are different. And in response to determining that the host data speed and the last know data speed are different, the transceiver may be reconfigured to operate at the host data speed.

19 Claims, 6 Drawing Sheets

DUAL RATE TRANSCEIVER

TECHNICAL FIELD

The present disclosure relates generally to data translation.

BACKGROUND

Data transmission, digital transmission, or digital communications is the physical transfer of data (e.g., a digital bit stream) over a point-to-point or point-to-multipoint communication channel. Examples of such channels are copper wires, optical fibers, wireless communication channels, and storage media. The data are represented as an electromagnetic signal, such as an electrical voltage, radiowave, microwave, or infrared signal.

While analog transmission is the transfer of a continuously varying analog signal, digital communications is the transfer of discrete messages. The messages are either represented by a sequence of pulses by a line code (e.g., baseband transmission), or by a limited set of continuously varying wave forms (e.g., passband transmission), using a digital modulation method. The passband modulation and corresponding demodulation is carried out by modem equipment. According to the most common definition of digital signal, both baseband and passband signals representing bit-streams are considered as digital transmission.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
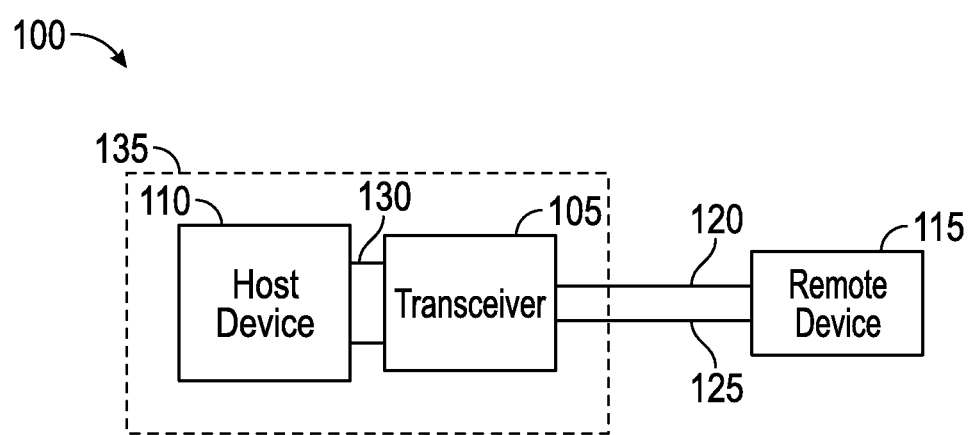
FIG. 1 is a block diagram of an operating environment for providing a dual rate transceiver.

A dual rate transceiver may be provided. First, a host data speed of a host device may be detected. Then a last know data speed of a transceiver may be determined. Next, it may be determined that the host data speed and the last know data speed are different. And in response to determining that the host data speed and the last know data speed are different, the transceiver may be reconfigured to operate at the host data speed.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A small form-factor pluggable (SFP) may comprise a compact, hot-pluggable transceiver used for both telecommunication and data communications applications. The form factor and electrical interface for the SFP may be specified by a multi-source agreement (MSA). An SFP transceiver may interface a network device motherboard (e.g. in a switch, router, media converter or similar device) to a fiber optic or copper networking cable. SFP is an industry format jointly developed and supported by many network component vendors. SFP transceivers are designed, for example, to support SONET, Gigabit Ethernet, Fibre Channel, and other communications standards.

SFP transceivers may be available with a variety of transmitter and receiver types. This may allow users to select an appropriate transceiver for each link to provide a desired optical reach over an available optical fiber type (e.g. multi-mode fiber or single-mode fiber). SFP transceivers may be available in several different categories.

Furthermore, SFP transceivers may operate at different data speeds, for example, at Fast Ethernet (FE) data speeds or at Gigabit Ethernet (GE) data speeds. FE is a collective term for a number of Ethernet standards that may carry traffic at a nominal rate of 100 Mb/s, for example. GE is a term that may describe various technologies for transmitting Ethernet frames at a rate of a 1 Gb/s, for example.

Service providers may deploy next generation wireless networks using, for example, SFP transceivers in central offices. Data may be transceived with a subscriber over a data link connected to an SFP transceiver in a central office. However, the service provider may not know ahead of time whether the subscriber may be operating the data link at, for example, 100 Mb/s (e.g. FE) data speeds or at 1 Gb/s (e.g. GE) data speeds. Consequently, consistent with embodiments of the present disclosure, a dual rate transceiver may be provided that may support, for example, both 100 Mb/s (FE) and 1 Gb/s (GE) data rates.

The dual rate transceiver consistent with embodiments of the disclosure may intelligently detect a host data speed from a system host transmit data path. In response, the dual rate transceiver may set a proper optical power level corresponding to the detected host data speed for the dual rate transceiver in accordance to, for example, IEEE optical standards. Once the data rate of the host is known, the dual rate transceiver consistent with embodiments of the disclosure may also be able to reconfigure its EEPROM contents (compliance code, for example) and imitate itself as a legacy FE or GE SFP module towards the host. As such, the dual rate transceiver consistent with embodiments of the disclosure may behave as a legacy FE or GE SFP when it is inserted into the deployed system in the field.

FIG. 1 is a block diagram of an operating environment 100 for providing a dual rate transceiver. As shown in FIG. 1, operating environment 100 may comprise a transceiver 105, a host device 110, and a remote device 115. Transceiver 105 may comprise a dual rate transceiver consistent with embodiments of the disclosure. The form factor and electrical interface for transceiver 105 may be consistent with SFP and may be specified by a multi-source agreement (MSA).

Transceiver 105 may communicate with remote device 115 over a data link comprising a receive fiber 120 and a transmit fiber 125. In other words, transceiver 105 may receive data from remote device 115 over receive fiber 120 and may transmit data to remote device 115 over transmit fiber 125.

A connector 130 may comprise, for example, a 20-pin connector and may connect transceiver 105 with host device 110. Host device 110 may comprise, but is not limited to, a router, a switch, a gateway, or a bridge, for example. Transceiver 105 and host device 110 may be located at a location 135. Location 135 may comprise, but is not limited to a service provider's central office for example.

Figure 2:
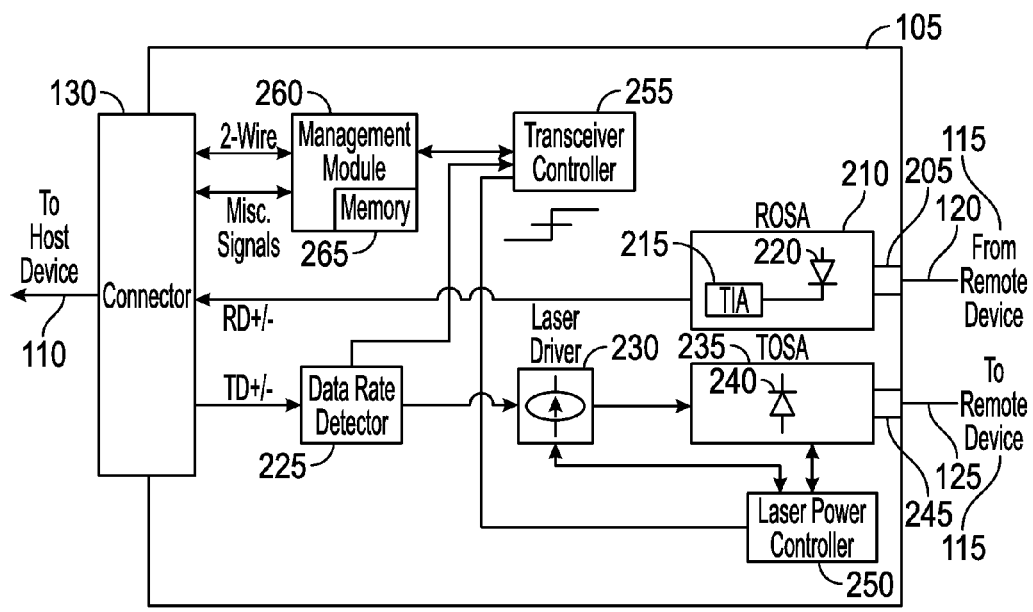
FIG. 2 is a block diagram of a dual rate transceiver.

FIG. 2 is a block diagram of transceiver 105. As shown in FIG. 1, transceiver 105 may comprise a receiver connector 205 that may connect transceiver 105 with receive fiber 120 from which transceiver 105 may receive optical data from remote device 115 over the data link. Transceiver 105 may further comprise a receive optical subassembly (ROSA) 210 that may comprise a transmit impedance amplifier (TIA) 215 and a receive diode 220. ROSA 210 may convert the optical data received from receive fiber 120 from an optical signal to an electrical signal. TIA 215 may then send the converted electrical signal to host device 110 through connector 130 over a receive path (RD).

Transceiver 105 may further comprise a data rate detector 225. Data rate detector 225 may be connected to a system host transmit data path (TD) of transceiver 105. TD may receive an electrical data signal from host device 110 through connector 130. Data rate detector 225 may intelligently detect from TD a host data speed of the data that host device 110 is transmitting into transceiver 105.

Data rate detector 225 may sample data received from host device 110 and provide an output indicating the host data speed. Data rate detector 225 may comprise an application-specific integrated circuit (ASIC), electrical circuit comprising discrete electronic elements, packaged or integrated electronic chips containing logic gates, a circuit utilizing a microprocessor, or on a single chip containing electronic elements or microprocessors. For example, data rate detector 225 may comprise an integrated circuit configured to sample data received from host device 110 and provide an output indicating the host data speed. Moreover, as described in greater detail below with respect to FIG. 3, data rate detector 225 may comprise an amplitude detector connected to an output of a low pass filter.

The data that host device 110 may transmit into transceiver 105 may then be converted from an electrical signal to an optical signal by a laser driver 230 and a transmit optical subassembly (TOSA) 235, which may include a transmit diode 240. TOSA 235 may connect to transmit fiber 125 via a transmit connector 245. The converted optical data may be transmitted to remote device 115 over transmit fiber 125.

A laser power controller 250 may also be included in transceiver 105. Laser power controller 250 may set a proper optical power level for laser driver 230 and TOSA 235 corresponding to a detected host data speed in accordance to, for example, IEEE optical standards. For example, if the detected host data speed is FE, then laser power controller 250 may set the optical power level for laser driver 230 and TOSA 235 corresponding to FE. However, if the detected host data speed is GE, then laser power controller 250 may set the optical power level for laser driver 230 and TOSA 235 corresponding to GE. FE and GE are examples and laser power controller 250 may set the optical power level for laser driver 230 and TOSA 235 corresponding to any detected host data speed.

Transceiver 105 may further comprise a transceiver controller 255, a management module 260, and a memory 265. Transceiver controller 255 may comprise, for example, an application-specific integrated circuit (ASIC), electrical circuit comprising discrete electronic elements, packaged or integrated electronic chips containing logic gates, a circuit utilizing a microprocessor, or on a single chip containing electronic elements or microprocessors. For example, transceiver controller 255 may comprise, but is not limited to, a computing device 600 as described in greater detail below with respect to FIG. 6.

Consistent with embodiments of the disclosure, transceiver controller 255 may receive the host data speed of host device 110 from data rate detector 225 and receive a last know data speed of transceiver 105 from memory 265. Transceiver controller 255 may then determine that the host data speed and the last know data speed are different. In response to determining that the host data speed and the last know data speed are different, transceiver controller 255 may reconfigure transceiver 105. In reconfiguring transceiver 105, transceiver controller 255 may cause transceiver 105 to operate at the host data speed. In reconfiguring transceiver 105 to operate at the host data speed, transceiver controller 255 may instruct laser power controller 250 to set a proper optical power level for laser driver 230 and TOSA 235 corresponding to the detected host data speed.

Moreover, in reconfiguring transceiver 105, transceiver controller 255 may change memory 265 to indicate that transceiver 105 is now operating at the host data speed instead of the last know speed. In addition, transceiver controller 255 may change memory 265 to indicate digital optical monitoring (DOM) parameters consistent with the host data speed (i.e., the new speed at which transceiver 105 will now be operating.) Transceiver 105 may support digital diagnostics monitoring (DDM) functions according to, for example, industry-standards. This support feature may be referred to as DOM. Consequently, users of transceiver 105 may have the ability in real time to monitor parameters of transceiver 105, for example, optical output power, optical input power, temperature, laser bias current, and transceiver supply voltage.

Furthermore, in reconfiguring transceiver 105, transceiver controller 255 may toggle a pin on connecter 130. By toggling the pin on connecter 130, host device 110 may be informed that transceiver 105 has been reconfigured to operate at the host data speed. Toggling the pin on connecter 130 may simulate to host device 110 the unplugging of connecter 130 from host 110 and the re-plugging of connecter 130 to host 110.

Figure 3:
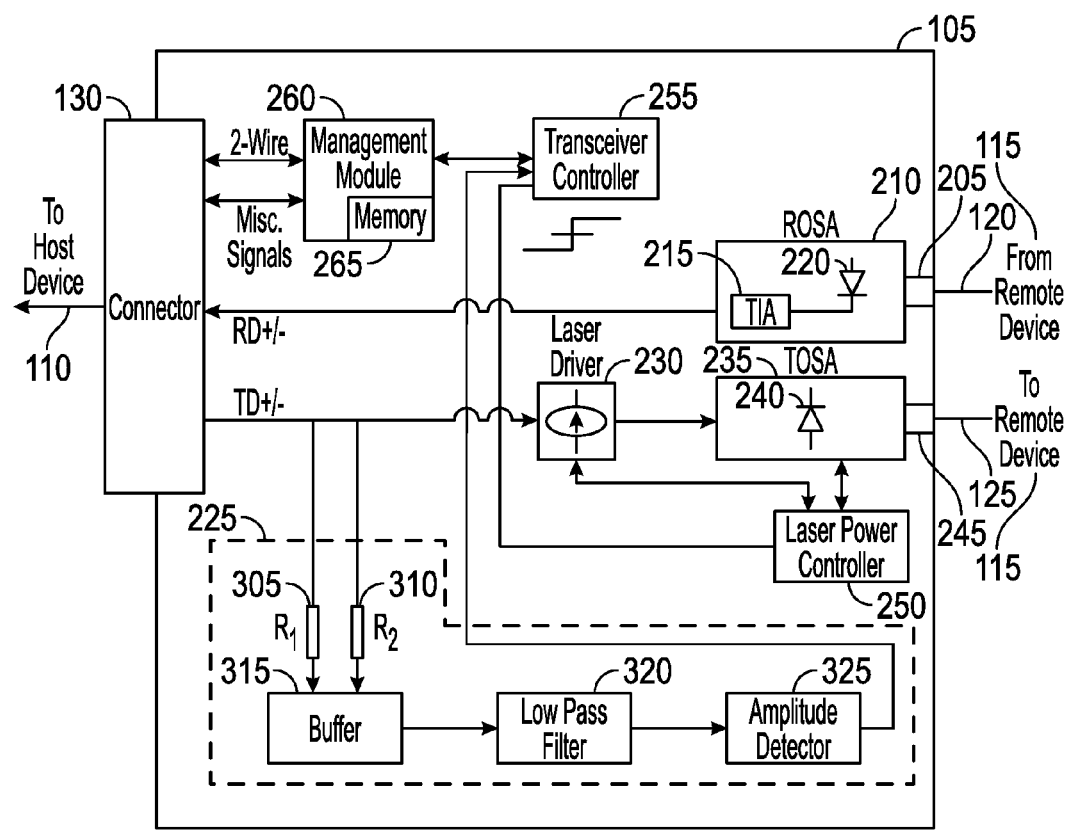
FIG. 3 is a block diagram of a dual rate transceiver.

FIG. 3 is a block diagram of transceiver 105 showing an embodiment of data rate detector 225. As stated above, data rate detector 225 may be configured to sample data received from host device 110 and provide an output indicating the host data speed. As shown in FIG. 3, data rate detector 225 may comprise a first resistor 305, a second resistor 310, a buffer 315, a low pass filter 320, and an amplitude detector 325. The transmit data path (TD) may be branched out over first resistor 305 and second resistor 310 and the output of the resistors may be buffered in buffer 315. The output from buffer 315 may be passed through low pass filter 320 (which may comprise an RC filter.) Low pass filter 320 may have a −3 dB frequency around 62.5 MHz. The output of low pass filter 320 may be fed to amplitude detector 325. For GE, the half date rate frequency may be at 625 MHz and the output of low pass filter 320 may have a 20 dB attenuation. Consequently, amplitude detector 325 may distinguish between GE and FE, for example.

Figure 4:
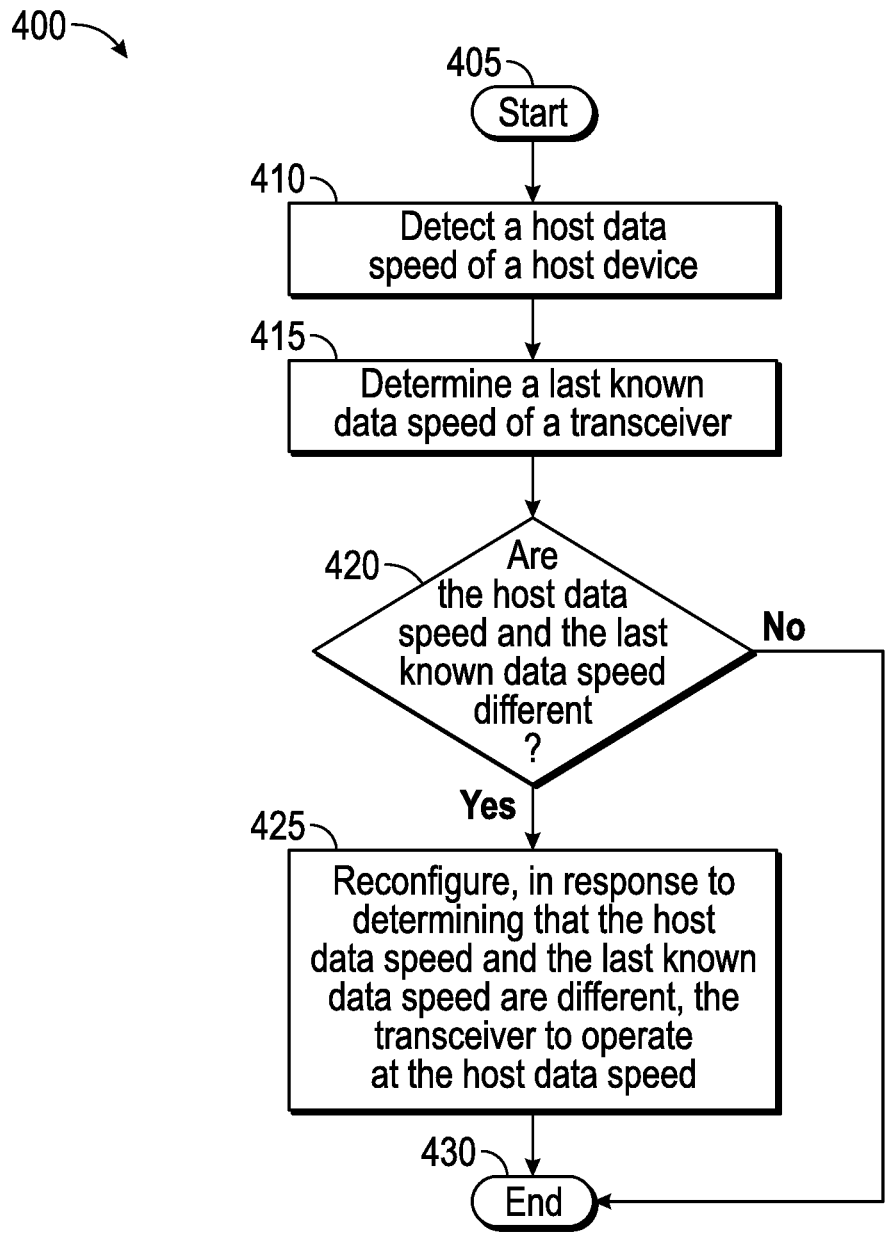
FIG. 4 is a flow chart of a method for providing a dual rate transceiver.

FIG. 4 is a flow chart setting forth the general stages involved in a method 400 consistent with an embodiment of the disclosure for providing a dual rate transceiver. Method 400 may be implemented using transceiver controller 255 as described in more detail above with respect to FIG. 2 and FIG. 3. For example, transceiver controller 255 may comprise, but is not limited to, computing device 600 as described in greater detail below with respect to FIG. 6. Ways to implement the stages of method 400 will be described in greater detail below.

Method 400 may begin at starting block 405 and proceed to stage 410 where transceiver controller 255 may detect a host data speed of host device 110. For example, transceiver controller 255 may receive the host data speed of host device 110 from data rate detector 225. Data rate detector 225 may be connected to the system host transmit data path (TD) of transceiver 105. TD may receive an electrical data signal from host device 110 through connector 130. Data rate detector 225 may intelligently detect from TD the host data speed of the data that host device 110 is transmitting into transceiver 105. Data rate detector 225 may then output the detected host data speed to transceiver controller 255.

From stage 410, where transceiver controller 255 detects the host data speed of host device 110, method 400 may advance to stage 415 where transceiver controller 255 may determine a last know data speed of transceiver 105. For example, each time transceiver 105 powers up and operates, it may store in memory the speed at which transceiver 105 is operating. If transceiver 105 operates at GE for example, it may store this information in memory 265. Similarly, if transceiver 105 operates at FE for example, it may store this information in memory 265. Regardless, each time transceiver 105 powers up to operate, transceiver controller 255 may query memory 265 to determine the rate at which transceiver 105 operated at the last time it operated.

Once transceiver controller 255 determines the last know data speed of transceiver 105 in stage 415, method 400 may continue to decision block 420 where transceiver controller 255 may determine whether the host data speed and the last know data speed are different. For example, if the host data speed and the last know data speed are the same, then host 110 and transceiver 105 may work together without any change to transceiver 105. In other words, at power up, transceiver 105 may already be setup for the speed at which host 110 is operating. For example, if host 110 is operating at GE and transceiver 105 is operating at GE, then no change may be needed in transceiver 105. However, if host 110 is operating at GE and transceiver 105 powers up operating at FE, then transceiver 105 may need to be reconfigured to operate at GE.

If it is determined by transceiver controller 255 that the host data speed and the last know data speed are different in decision block 420, method 400 may proceed to stage 425 where transceiver controller 255 may reconfigure transceiver 105 to operate at the host data speed. For example, in reconfiguring transceiver 105 to operate at the host data speed, transceiver controller 255 may instruct laser power controller 250 to set a proper optical power level for laser driver 230 and TOSA 235 corresponding to the detected host data speed.

Figure 5:
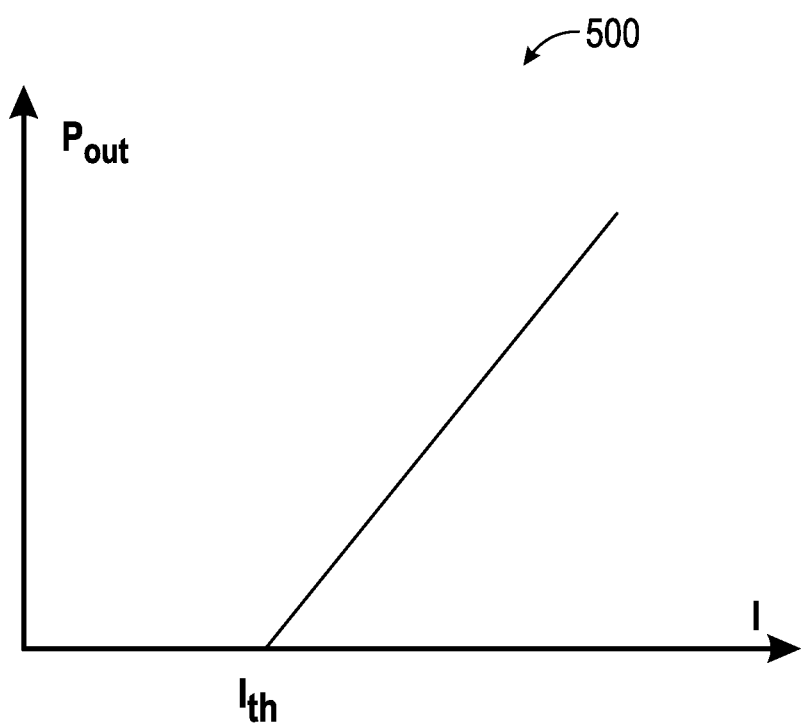
FIG. 5 is a graph of laser output power vs. bias current.

FIG. 5 is a graph of laser output power ($P_{out}$) vs. bias current (I) at a given temperature T for TOSA 235. $P_{out}$ may be set by a corresponding I value. Once transceiver controller 255 communicates the desired operating speed (e.g. GE or FE) for transceiver 105 to laser power controller 250, laser power controller 250 may configure the transmit power for TOSA 235 by setting a corresponding laser bias current (I).

Moreover, in reconfiguring transceiver 105, transceiver controller 255 may change memory 265 to indicate that transceiver 105 is now operating at the host data speed instead of the last know speed. In addition, transceiver controller 255 may change memory 265 to indicate digital optical monitoring (DOM) parameters consistent with the host data speed (i.e., the new speed at which transceiver 105 will now be operating.) Transceiver 105 may support digital diagnostics monitoring (DDM) functions according to, for example, industry-standards. This support feature may be referred to as DOM. Consequently, users of transceiver 105 may have the ability in real time to monitor parameters of transceiver 105, for example, optical output power, optical input power, temperature, laser bias current, and transceiver supply voltage.

Furthermore, in reconfiguring transceiver 105, transceiver controller 255 may toggle a pin on connecter 130. By toggling the pin on connecter 130, host device 110 may be informed that transceiver 105 has been reconfigured to operate at the host data speed. Toggling the pin on connecter 130 may simulate to host device 110 unplugging connecter 130 from host 110 and re-plugging connecter 130 to host 110.

Once transceiver controller 255 reconfigures transceiver 105 to operate at the host data speed in stage 425, or if it was determined by transceiver controller 255 in decision block 420 that the host data speed and the last know data speed are not different, method 400 may then end at stage 430.

Figure 6:
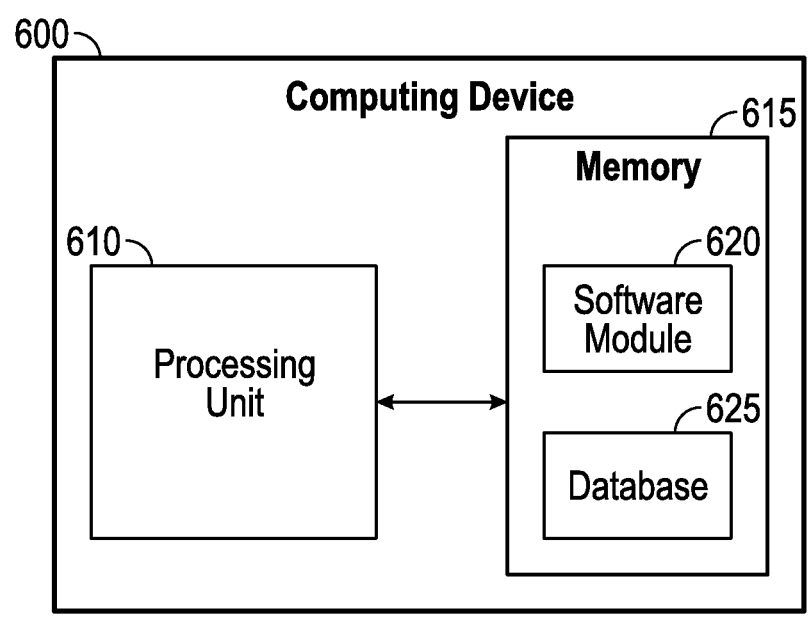
FIG. 6 is a block diagram of a computing device.

FIG. 6 shows computing device 600 in more detail. As shown in FIG. 6, computing device 600 may include a processing unit 610 and a memory unit 615. Memory unit 615 may include a software module 620 and a database 625. While executing on processing unit 610, software module 620 may perform processes for providing a dual rate transceiver, including for example, any one or more of the stages from method 400 described above with respect to FIG. 4. Computing device 600, for example, may provide an operating environment for transceiver controller 255. Transceiver controller 255 may operate in other environments and is not limited to computing device 600.

An embodiment consistent with the disclosure may comprise a system for providing a dual rate transceiver. The system may comprise a memory storage and a processing unit coupled to the memory storage. The processing unit may be operative to detect a host data speed of a host device and determine a last know data speed of a transceiver. The processing unit may be further operative to determine that the host data speed and the last know data speed are different. Moreover, the processing unit may be further operative to reconfigure, in response to determining that the host data speed and the last know data speed are different, the transceiver to operate at the host data speed.

Another embodiment consistent with the disclosure may comprise a system for providing a dual rate transceiver. The system may comprise a memory storage and a processing unit coupled to the memory storage. The processing unit may be operative to receive a host data speed of a host device, receive a last know data speed of a transceiver, and to determine that the host data speed and the last know data speed are different. The processing unit may be further operative to reconfigure, in response to determining that the host data speed and the last know data speed are different, the transceiver to operate at the host data speed. The processing unit being configured to reconfigure the transceiver to operate at the host data speed may comprises the processing unit being configured to: i) change a memory in the transceiver to indicate that the transceiver is operating at the host data speed and changing the memory in the transceiver to indicate digital optical monitoring (DOM) parameters consistent with the host data speed; ii) configure a laser power controller in the transceiver to operate at a transmit optical specification of the host data speed; iii) save to the memory in the transceiver the host data speed as the last known data rate; and iv) toggle a pin on a connecter on the transceiver.

Yet another embodiment consistent with the disclosure may comprise an apparatus for providing a dual rate transceiver. The apparatus may comprise a data rate detector and a transceiver controller. The data rate detector may be configured to detect a host data speed of a host device. The transceiver controller may be configured to receive the host data speed of the host device from the data rate detector, receive a last know data speed of a transceiver, and to determine that the host data speed and the last know data speed are different. In addition, the transceiver controller may be configured to reconfigure, in response to determining that the host data speed and the last know data speed are different, the transceiver to operate at the host data speed.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, flash memory, a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 2 and FIG. 3 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   detecting a host data speed of a host device from a system host transmit data path, wherein detecting the host data speed comprises:
     branching out the system host transmit data path over at least one register connected to the system host transmit data path, filtering the output from the at least one register to a low pass filter, and detecting, by an amplitude detector connected to an output of the low pass filter, the host data speed from the filtered output;

determining a last know data speed of a transceiver;

determining that the host data speed and the last know data speed are different; and reconfiguring, in response to determining that the host data speed and the last know data speed are different, the transceiver to operate at the host data speed.

2. The method of claim 1, wherein detecting the host data speed of the host device comprises detecting the host data speed of the host device comprising one of the following: a router; a switch; a gateway; and a bridge.

3. The method of claim 1, wherein detecting the host data speed of the host device comprises using a data rate detector in the transceiver, the data rate detector configured to sample data received from the host device to determine the host data speed.

4. The method of claim 1, wherein detecting the host data speed of the host device comprises using a data rate detector in the transceiver, the data rate detector configured to sample data received from the host device to determine the host data speed, the data rate detector comprising an integrated circuit configured to sample data received from the host device and provide an output indicating the host data speed.

5. The method of claim 1, wherein detecting the host data speed of the host device comprises using a data rate detector in the transceiver, the data rate detector configured to sample data received from the host device to determine the host data speed, the data rate detector comprising the amplitude detector connected to an output of the low pass filter having a −3 dB frequency around 62.5 MHz.

6. The method of claim 1, wherein determining the last know data speed of the transceiver comprises determining the last know data speed of the transceiver comprising a small form-factor pluggable (SFP) transceiver.

7. The method of claim 1, wherein determining the last know data speed of the transceiver comprises receiving the last know data speed of the transceiver from a memory in the transceiver.

8. The method of claim 1, wherein determining that the host data speed and the last know data speed are different comprises using a transceiver controller located in the transceiver.

9. The method of claim 1, wherein determining that the host data speed and the last know data speed are different comprises:

determining that the host data speed is 100 Mb/s Fast Ethernet (FE); and determining that the last know data speed is 1 Gb/s GigE (GE).

10. The method of claim 1, wherein determining that the host data speed and the last know data speed are different comprises:

determining that the host data speed is 1 Gb/s GigE (GE); and determining that the last know data speed is 100 Mb/s Fast Ethernet (FE).

11. The method of claim 1, wherein reconfiguring the transceiver to operate at the host data speed comprises changing a memory in the transceiver to indicate that the transceiver is operating at the host data speed and changing the memory in the transceiver to indicate digital optical monitoring (DOM) parameters consistent with the host data speed.

12. The method of claim 1, wherein reconfiguring the transceiver to operate at the host data speed comprises configuring a laser power controller in the transceiver to operate at a transmit optical specification of the host data speed.

13. The method of claim 1, wherein reconfiguring the transceiver to operate at the host data speed comprises saving to a memory in the transceiver the host data speed as the last known data rate.

14. The method of claim 1, wherein reconfiguring the transceiver to operate at the host data speed comprises toggling a pin on a connecter on the transceiver.

15. A system comprising:

a memory storage; and a processing unit coupled to the memory storage, the processing unit being configured to:

receive, from a data rate detector, a host data speed of a host device from a system host transmit data path, wherein the data rate detector comprises:

a first resistor connected to the system host transmit data path, a second resistor connected to the system host transmit data path, a low pass filter connected to the first resistor and the second resistor, and an amplitude detector connected to an output of the low pass filter, the amplitude detector configures to provide an output to the transceiver controller indicating the host data speed;

receive a last know data speed of a transceiver;

determine that the host data speed and the last know data speed are different; and reconfigure, in response to determining that the host data speed and the last know data speed are different, the transceiver to operate at the host data speed, wherein the processing unit being configured to reconfigure the transceiver to operate at the host data speed comprises the processing unit being configured to:

change a memory in the transceiver to indicate that the transceiver is operating at the host data speed and changing the memory in the transceiver to indicate digital optical monitoring (DOM) parameters consistent with the host data speed, configure a laser power controller in the transceiver to operate at a transmit optical specification of the host data speed, save to the memory in the transceiver the host data speed as the last known data rate, and toggle a pin on a connecter on the transceiver.

16. The system of claim 15, wherein the processing unit being configured to determine that the host data speed and the last know data speed are different comprises the processing unit being configured to:

determine that the host data speed is 100 Mb/s Fast Ethernet (FE); and determine that the last know data speed is 1 Gb/s GigE (GE).

17. The system of claim 15, wherein the processing unit being configured to determine that the host data speed and the last know data speed are different comprises the processing unit being configured to:

determine that the host data speed is 1 Gb/s GigE (GE); and determine that the last know data speed is 100 Mb/s Fast Ethernet (FE).

18. An apparatus comprising:
a data rate detector configured to detect a host data speed of a host device, the data rate detector being connected to a system host transmit data path, wherein the data rate detector comprises:
   a first resistor connected to the system host transmit data path,
   a second resistor connected to the system host transmit data path,
   a low pass filter connected to the first resistor and the second resistor, and
   an amplitude detector connected to an output of the low pass filter, the amplitude detector configures to provide an output to the transceiver controller indicating the host data speed; and
a transceiver controller configured to:
   receive the host data speed of the host device from the data rate detector;
   receive a last know data speed of a transceiver;
   determine that the host data speed and the last know data speed are different; and
   reconfigure, in response to determining that the host data speed and the last know data speed are different, the transceiver to operate at the host data speed.

19. The apparatus of claim 18, wherein the data rate detector comprises an integrated circuit configured to sample data received from the host device and provide an output to the transceiver controller indicating the host data speed.

* * * * *